United States Patent
Famularo et al.

(10) Patent No.: US 10,163,149 B1
(45) Date of Patent: Dec. 25, 2018

(54) PROVIDING ITEM PICK AND PLACE INFORMATION TO A USER

(71) Applicant: Amazon Technologies, Inc., Reno, NV (US)

(72) Inventors: Jason Michael Famularo, Seattle, WA (US); Jared Joseph Frank, Snoqualmie, WA (US); Thomas Meilandt Mathiesen, Seattle, WA (US); Gianna Lise Puerini, Bellevue, WA (US); Dilip Kumar, Seattle, WA (US); Amber Autrey Taylor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1250 days.

(21) Appl. No.: 14/229,342

(22) Filed: Mar. 28, 2014

(51) Int. Cl.
*G06Q 30/00* (2012.01)
*G06Q 30/06* (2012.01)
*G06Q 10/08* (2012.01)

(52) U.S. Cl.
CPC ......... *G06Q 30/0635* (2013.01); *G06Q 10/08* (2013.01); *G06Q 10/087* (2013.01); *G06Q 30/0623* (2013.01); *G06Q 30/0631* (2013.01)

(58) Field of Classification Search
CPC ......... G06Q 30/00–30/08; G06Q 10/00–10/30
See application file for complete search history.

(56) References Cited

U.S. PATENT DOCUMENTS

| 6,496,806 | B1 * | 12/2002 | Horwitz | G06K 17/0029 340/10.1 |
|---|---|---|---|---|
| 7,225,980 | B2 | 6/2007 | Ku et al. | |
| 7,504,949 | B1 * | 3/2009 | Rouaix | G06Q 10/06 235/375 |
| 7,516,848 | B1 * | 4/2009 | Shakes | B07C 5/38 209/34 |
| 7,949,568 | B2 | 5/2011 | Fano et al. | |
| 8,009,864 | B2 | 8/2011 | Linaker et al. | |
| 8,175,925 | B1 | 5/2012 | Rouaix | |
| 8,189,855 | B2 | 5/2012 | Opalach et al. | |

(Continued)

OTHER PUBLICATIONS

Abhaya Asthana et al., "An Indoor Wireless System for Personalized Shopping Assistance", Proceedings of IEEE Norkshop on Mobile Computing Systems and Applications, 1994, pp. 69-74, Publisher: IEEE Computer Society Press.

(Continued)

*Primary Examiner* — Michael Misiaszek
(74) *Attorney, Agent, or Firm* — Athorus, PLLC

(57) ABSTRACT

Described is a system and method for presenting item information to a user based on the activities of the user. In one example, when a user picks an item from an inventory location, the item is identified, and a representation of the item, and optionally additional item information, is presented to the user as a confirmation that the item was properly identified. If the user adds the item to a tote associated with the user, an item identifier associated with the item is added to an item identifier list associated with the user. Likewise, an item identifier list representation, which provides information about all items identified on the item identifier list may be presented to the user as confirmation that the correct item has been added to the user item identifier list associated with the user.

19 Claims, 14 Drawing Sheets

(56) References Cited

U.S. PATENT DOCUMENTS

| | | | |
|---|---|---|---|
| 8,423,431 B1* | 4/2013 | Rouaix | B65G 1/1373 705/28 |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2006/0206235 A1* | 9/2006 | Shakes | G06Q 10/08 700/216 |
| 2007/0150383 A1* | 6/2007 | Shakes | G06Q 10/087 705/29 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0183327 A1* | 7/2008 | Danelski | B65G 1/137 700/216 |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0232689 A1* | 9/2012 | Buchmann | B65G 1/137 700/216 |
| 2012/0284132 A1 | 11/2012 | Kim et al. | |
| 2013/0076898 A1 | 3/2013 | Philippe et al. | |
| 2013/0159135 A1* | 6/2013 | Jones | G06Q 10/087 705/26.8 |
| 2013/0218799 A1* | 8/2013 | Lehmann | G06Q 10/063 705/337 |
| 2013/0253700 A1 | 9/2013 | Carson et al. | |
| 2014/0279294 A1* | 9/2014 | Field-Darragh | G06Q 10/087 705/28 |
| 2015/0019391 A1 | 1/2015 | Kumar et al. | |
| 2015/0073907 A1 | 3/2015 | Purves et al. | |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

PROVIDING ITEM PICK AND PLACE INFORMATION TO A USER

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in an inventory area, or fulfillment center, that can be used to replenish inventory located in the shopping areas and/or to satisfy orders for items that are placed through other channels (e.g., e-commerce). Other examples of entities that maintain inventory include libraries, museums, rental centers, and the like. In each instance, during movement of items, they often get placed at the wrong location and/or improperly positioned such that they are not easily identifiable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
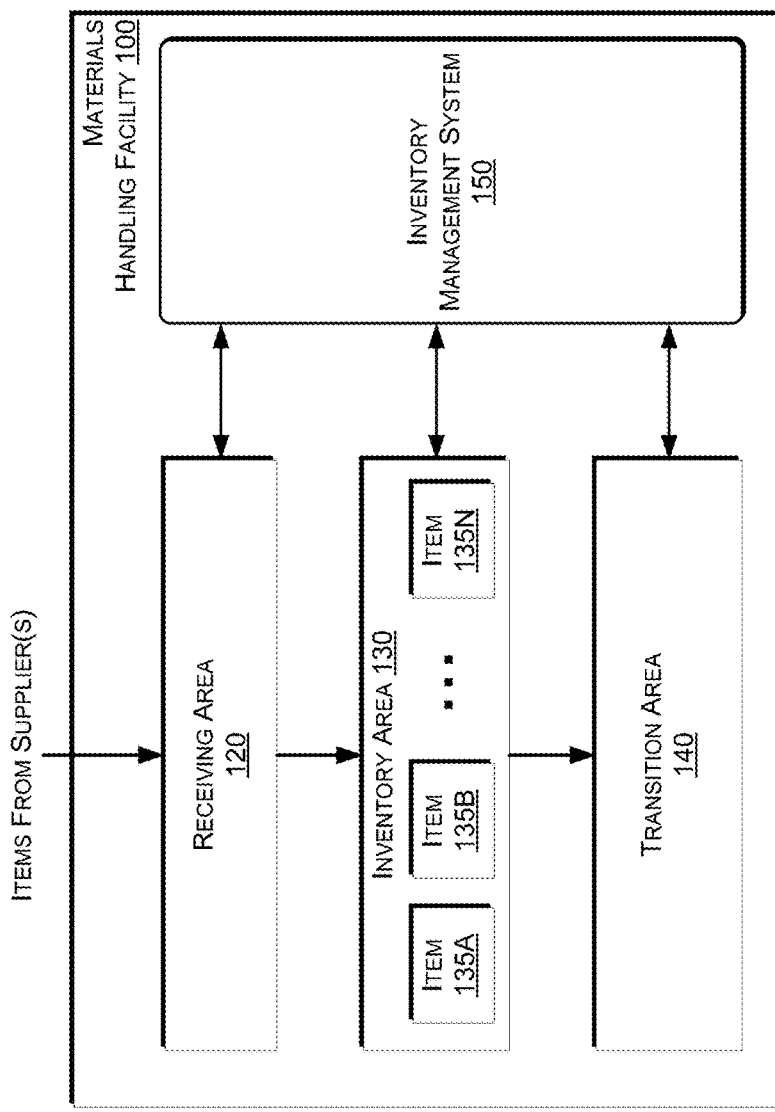
FIG. 1 is a block diagram illustrating a materials handling facility, according to one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for presenting item information to a user based on the activities of the user. In one example, when a user picks an item from an inventory location, the item is identified, and a representation of the item, and optionally additional item information, is presented to the user as a confirmation that the item was properly identified. If the user adds the item to a tote associated with the user, an item identifier associated with the item is added to an item identifier list associated with the user. Likewise, an item identifier list representation, which provides information about items identified on the item identifier list may be presented to the user as confirmation that the correct item has been added to the item identifier list associated with the user.

If, after an item is picked from an inventory location, the user returns the item to the inventory location, presentation of the representation of the item and/or the additional information is terminated. If the user removes an item from the tote associated with the user, the removed item is identified, and a representation of the item and optionally additional item information is presented to the user as confirmation that the item removed from the tote was properly identified. Likewise, if the user places the item at an inventory location, the item identifier associated with the item is removed from the item identifier list associated with the item and an updated item identifier list representation is presented to the user, which does not include a representation of the removed item. In some examples, the updated item identifier list representation may include a representation of the item that is modified to illustrate that the proper item has been removed from the item identifier list associated with the user.

In any instance, the user may interact with the presented information to, for example, confirm the identity of the item, or change the determined item to correspond with the actual item picked from an inventory location by a user, placed in a tote by the user, removed from the tote by the user, placed at an inventory location, etc.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances an item may be picked from its inventory area, moved a distance and placed at another location.

Figure 2:
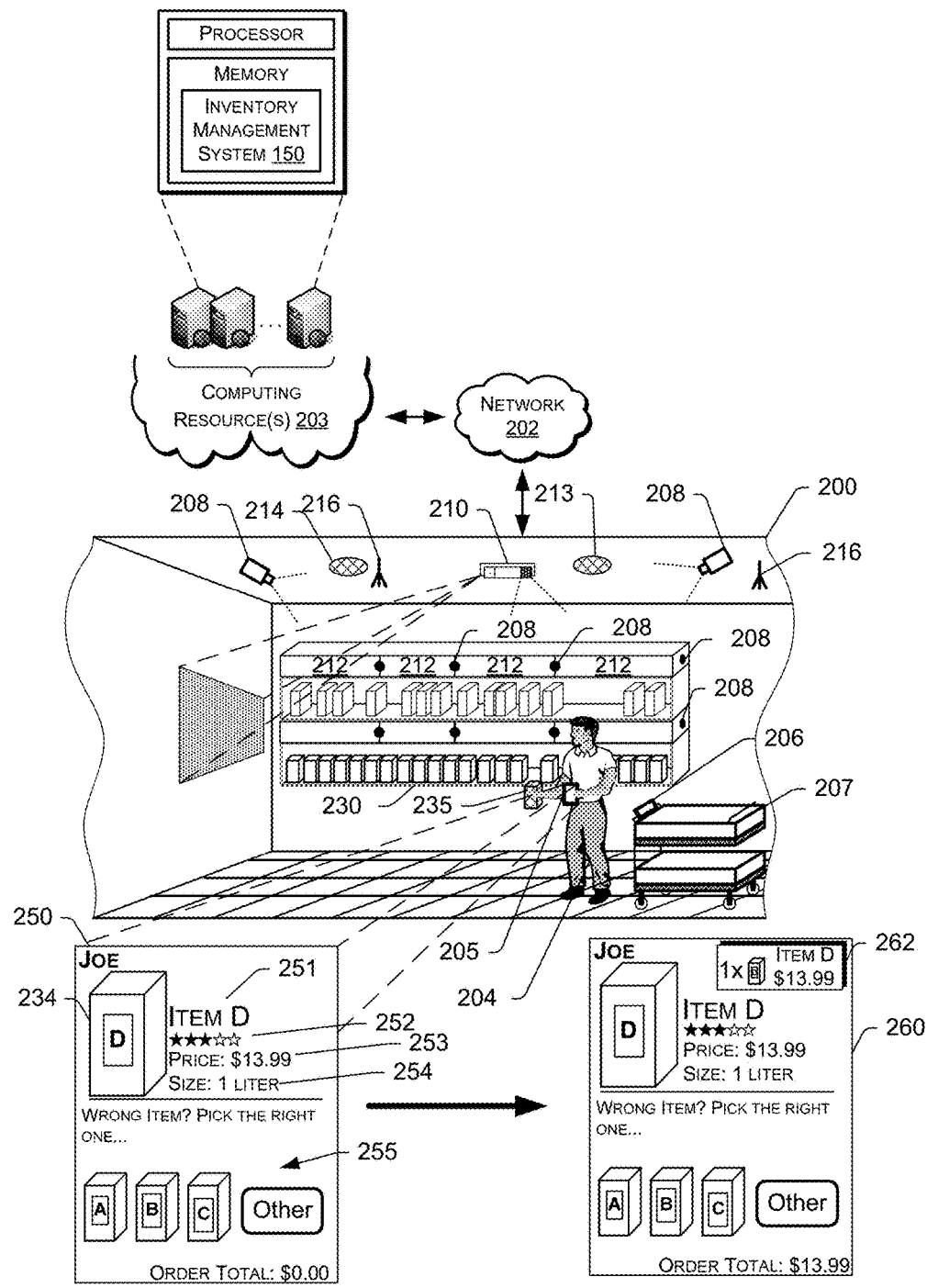
FIG. 2 is a block diagram illustrating additional details of a materials handling facility, according to one implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more cameras 208 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, etc., may be utilized with the implementations described herein. For example, a pressure sensor and/or a scale may be used to detect when an item is added and/or removed from inventory areas.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204, any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200, receive confirmation that the inventory management system 150 has correctly identified items that are picked and/or placed by the user and/or receive confirmation regarding the items currently identified on an item identifier list associated with the user. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components. Additional details of an example device are discussed below with respect to FIGS. 11-12.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

A tote 207 may also be associated with the user. The tote may be any form of apparatus configured to hold and/or carry items. For example, the tote 207 may be a bag, cart, trolly, etc. In some implementations, the tote 207 may include a device or display 206, which may be configured in a manner similar to the portable device 205. For example, the display 206 may include a display, such as a touch-based display, a memory, processor, speakers, wireless network connectivity, etc. As discussed further below, item information may be presented to the user via the portable device 205, the display 206 and/or any other output device located within the materials handling facility 200. Likewise, the portable device 205, the display 206 and/or any other input device located within the materials handling facility may be used to receive input from the user.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205, and/or display 206 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202. For example, when the user picks an item 235 from an inventory area 230, the inventory management system 150 may receive information, such as a load cell change and/or an image, identifying that an item has been removed from the inventory area 230. The item may then be identified and the inventory management system 150 may send item information to the portable device 205 for presentation to the user 204. In this example, the user 204 has picked "Item D" from the inventory area 230. The item was identified and item information provided over the network 202 from the inventory management system 150 to the portable device 205 and presented to the user 204, as illustrated by the user interface 250. In this example, the item information is used to graphically present a representation 234 of the picked item to the user via the display on the portable device 205. In other implementations, the item information may be provided to other output devices, such as displays 212, display 206, projector 210, speakers 213, etc., and presented to the user 204. In addition to the representation, the user interface 250 may also include additional information about the item, such as the name 251 of the item, the rating 252 of the item, the price 253 of the item, the size 254, the weight of the item, etc. Likewise, in some implementations, an alternative item selection control 255 may be presented to the user to enable the user to modify the identified item to correspond to the actually picked item, if they do not match.

The alternative item selection control 255 may include representations of other items that may corresponds with the picked item. If the user places the picked item 235 into the tote 207 associated with the user, the information presented on the portable device 205, or another output device, may be updated, as illustrated by the user interface 260, to confirm to the user that the picked item has been added to the item identifier list associated with the user. For example, a tote addition window 262 may be presented to include a representation of the item and a quantity of the item that has been added to the item identifier list associated with the user. As discussed further below, many additional configurations and forms of information may be provided to the user to provide confirmation that the inventory management system 150 is accurately identifying the items picked and/or placed by the user as well as the actions of the user.

Figure 3:
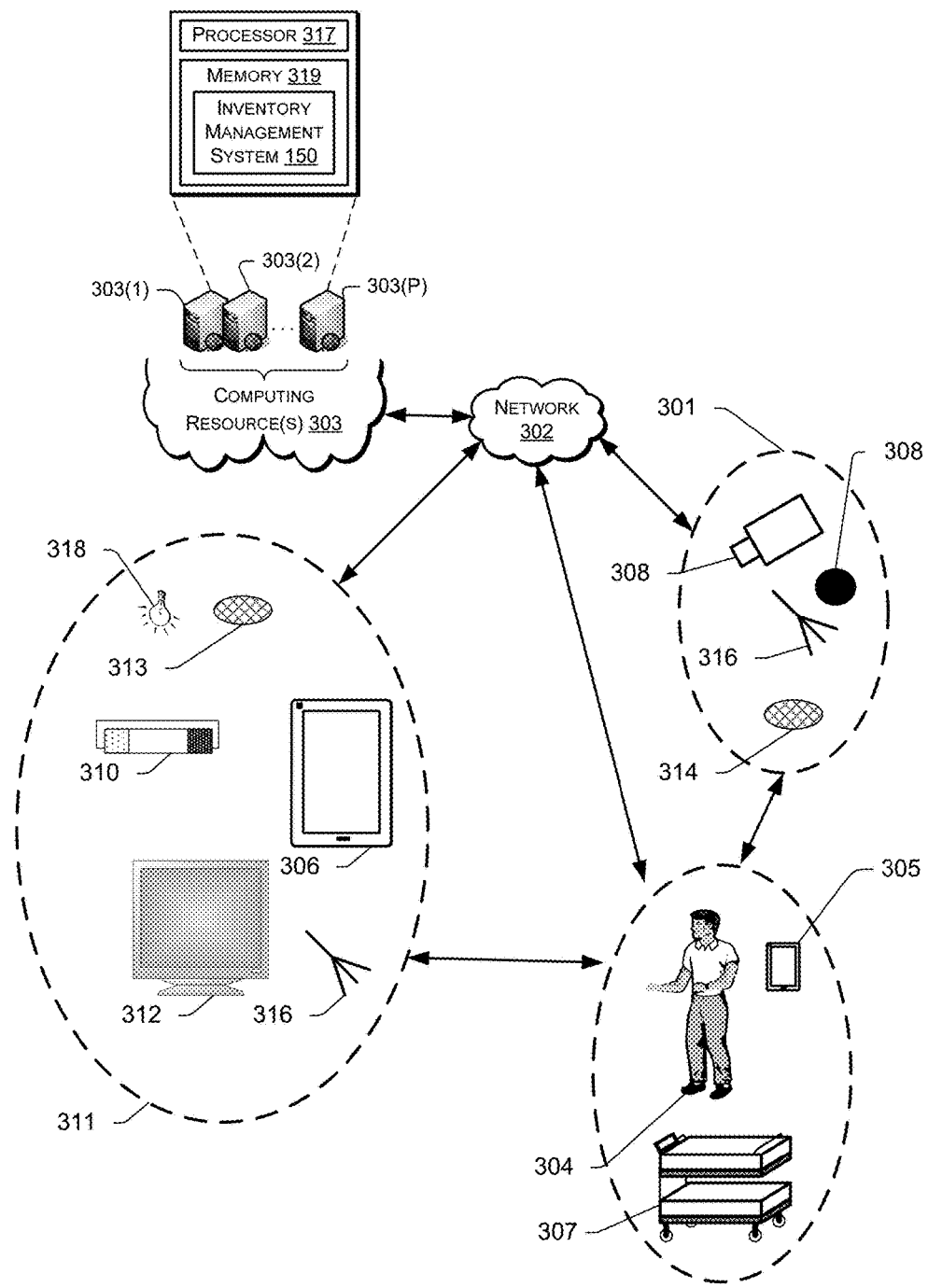
FIG. 3 shows additional components and communication paths between component types utilized in a materials handling facility of FIG. 1, according to one implementation.

FIG. 3 shows additional components and communication paths between component types utilized in a materials handling facility 100, in accordance with one implementation. As discussed above, the portable device 305 may communicate and interact with various components of an inventory management system 150 over a variety of communication paths. Generally, the inventory management system 150 may include input components 301, output components 311 and computing resource(s) 303. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305, the user 304 and/or the tote 307.

As illustrated, the computing resource(s) 303 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The computing resources 303 may process images of users 304 to identify the user 304, process images of items to identify items, determine a location of items and/or determine a position of items. The computing resource(s) 303 do not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
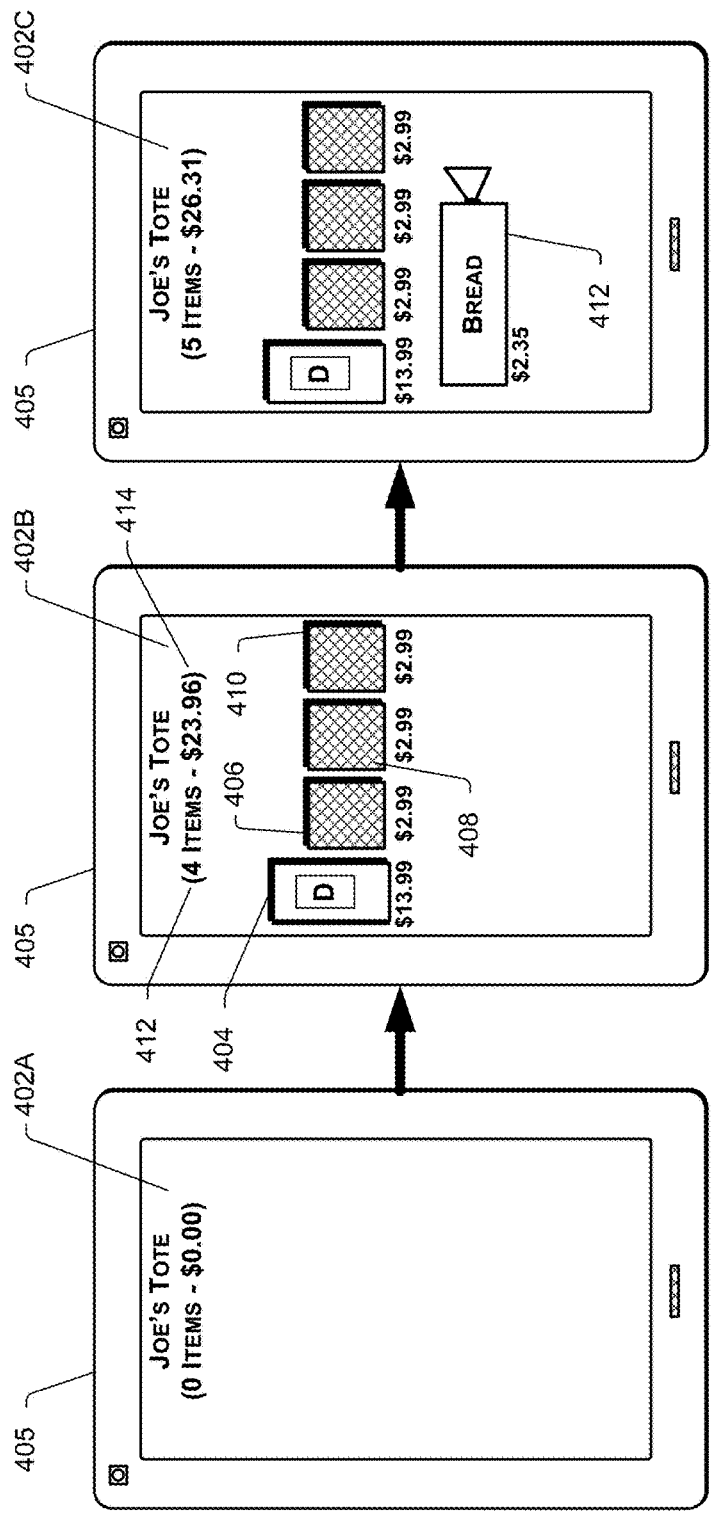
FIG. 4 is a block diagram of different stages of an item identifier list representation presented on a portable device, according to one implementation.
Figure 13:
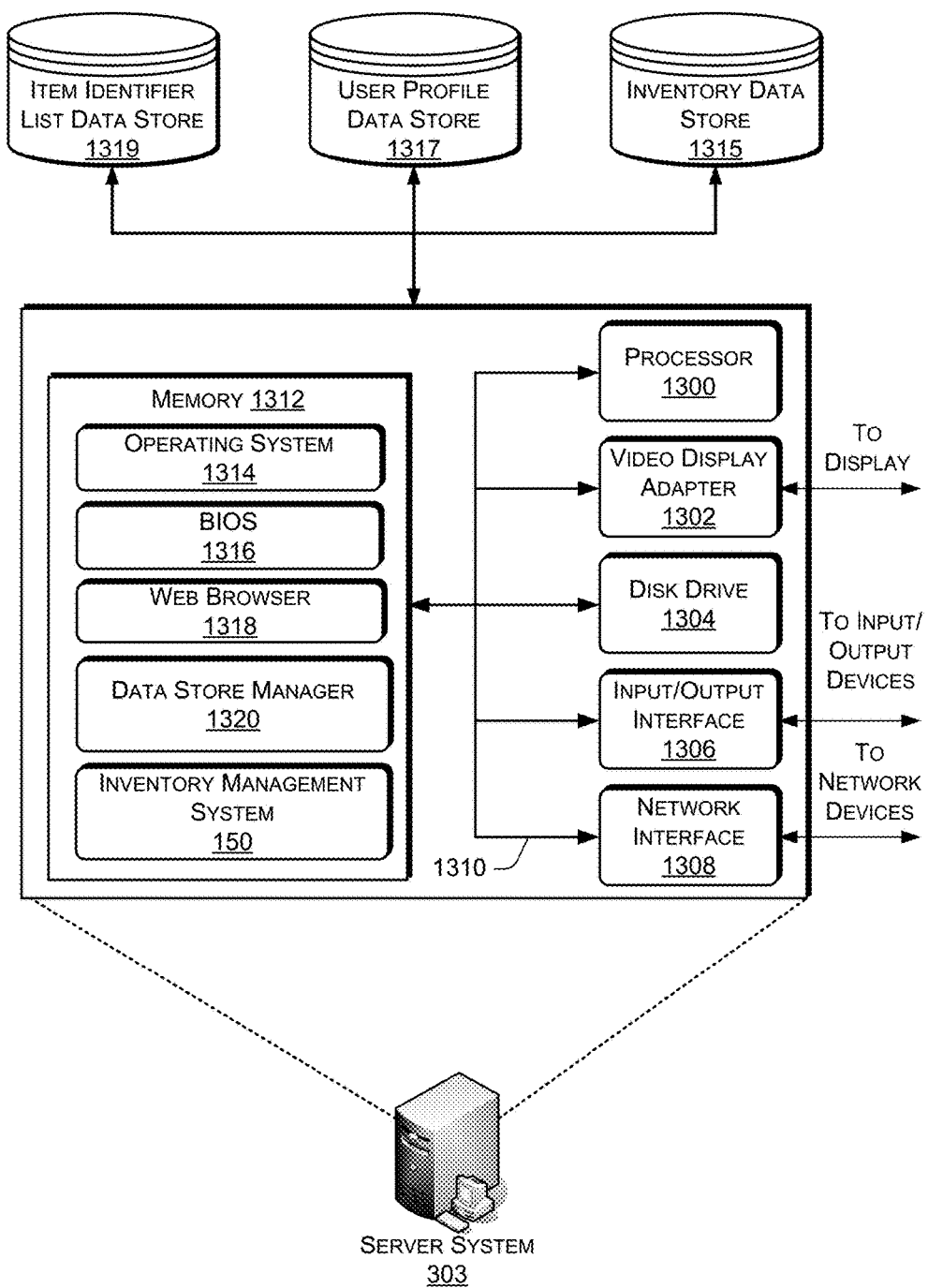
FIG. 13 is a block diagram of an illustrative implementation of a server system that may be used with various implementations.

FIG. 4 is a block diagram of different stages of an item identifier list representation 402 presented on a portable device 405, according to one implementation. An item identifier list representation 402 is a presentation of information representative of items identified by an item identifier on an item identifier list associated with the user. When a user first enters the materials handling facility and is identified, the item identifier list associated with the user, and the corresponding item identifier list representation 402 does not identify any items. In an example, the item identifier list representation is empty, as illustrated by the item identifier list representation 402A. The item identifier list may be maintained by the inventory management system 150 in an item identifier list data store 1319 (FIG. 13). The item identifier list data store may include an item identifier list for each user located in the materials handling facility and the inventory management system may add and/or remove item identifiers to/from the item identifier list as items are picked by users and placed in tote or removed from a tote and placed at an inventory location. Likewise, the inventory management system 150 may generate the item identifier list representation based on the items identified in the item identifier list. The item identifier list representation may then be sent to a portable device 405 and/or any other output device (e.g., display, projector) for presentation to a user.

Continuing with the example of the item identifier list representation illustrated in FIG. 4, as a user picks items from inventory locations and adds those picked items to a tote associated with the user, the picked items are identified and the item identifier list is updated to include an item identifier representative of each picked item that is added to the tote associated with the user. Likewise, the item identifier list representation is updated and the updated item identifier list representation is provided to the portable device 405 and/or any other output device for presentation to the user. In this example, the user has picked four items, those items have been identified and the corresponding item identifiers added to the item identifier list associated with the user. Likewise, the item identifier list representation has been updated to include a representation 404, 406, 408, 410 of each of the four item, as illustrated by the item identifier list representation 402B. In addition to providing a representation of each item added to the user's tote, item information, such as the items price may be presented as part of the item identifier list representation 402. Likewise, a total item count 414 and a total price 416 representative of the price of all the items identified on the item identifier list associated with the user may also be presented.

As the user continues to add items to the tote, the item identifier list is updated to include an item identifier for each added item and the item identifier list representation is updated to include a representation of each item along with item information. Continuing with the above example, when the user adds a fifth item 412 to their tote, the item identifier list is updated to include an item identifier associated with the item 412 and the item identifier list representation 402 is also updated to include a graphical representation of the item 412, as illustrated by the item identifier list representation 402C.

In some implementations, the graphical representations of items in the item identifier list representation 402 are sized in proportion to other items, to reflect the actual size of the items relative to each other. For example, the first item picked by the user is approximately twice as tall as the next three items picked by the user, each of which are approximately the same size. To illustrate the size difference of the items, the representations 406-410 of the items are in proportion with respect to one another in a similar manner as to the actual items they represent. In this example, the representation 404 of the first picked item is presented such that it is approximately twice as tall as the representations 406, 408, 410 of the next three picked items.

To further illustrate item information, in some implementations, the graphical representation of each item is presented in the order in which the represented item was picked by the user. For example, the representation 404 of the first picked item appears first, or on the left most side in this example, the representation 406 appears next, or adjacent to the representation 404 of the first item. In such an implementation, representations of items are added to the item identifier list representation in a sequential manner so that a user can visually view the item identifier list representation and see a chronological history of the items the user has picked and placed into the tote.

As discussed further below, a user may interact with any of the representations 404-412 to obtain additional information about an item, to correct the item identifier determined to be representative of the picked item, to change a quantity of the item, etc. Likewise, a user may rearrange the presentation of the graphical representations of each item. For example, if the user is selecting ingredients for a meal as part of their picking, they may rearrange the graphical representations of the items into groups to identify which of the needed items the user has already picked and placed into their tote.

FIGS. 5A-5D are block diagrams illustrating different item information presented on a device 505, according to one implementation. The device 505 illustrated in FIG. 5A-5D may include the same or similar components to the portable device. In this example, the device 505 includes a pair of bands 502 or straps that may be used to secure the device 505 to a user's arm, tote, etc.

Figure 5A:
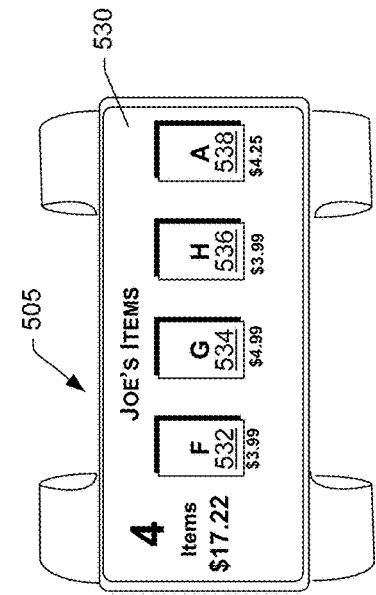
FIGS. 5A-5D are block diagrams illustrating different item information presented on a device, according to one implementation.

Turning first to FIG. 5A, the user interface 500 is an example representation when a user picks an item from an inventory location but has not yet placed the item into the tote associated with the user (or returned it to the inventory location). In the user interface 500, item identifier information is presented in conjunction with an item identifier list representation 504. As discussed above, the item identifier list representation may include a graphical representation of each item with an item identifier included on the item identifier list associated with the user. Likewise, the item information may also identify a quantity of items currently identified on the item identifier list along with the name 508 or other identifier of the user. In this example three items have been added to the user tote and identified in the item identifier list. Those three items are graphically represented in the item identifier list representation 504.

The item information 503 includes a graphical representation 510 of the item, in this example "Item A" determined to correspond with the item picked by the user. Additional item information, such as the name 512 of the item, a user or community rating 514 of the item, a price of the item 516, a quantity 518 of the item picked by the user, etc., may also be presented as part of the item information 503. The graphical representation of the item and the additional item information may be maintained by the inventory management system 150 in the inventory data store 1315 (FIG. 13) and provided to the device 505 when an item picked by the user is determined to have been identified. Item identification is discussed further below.

Figure 5B:
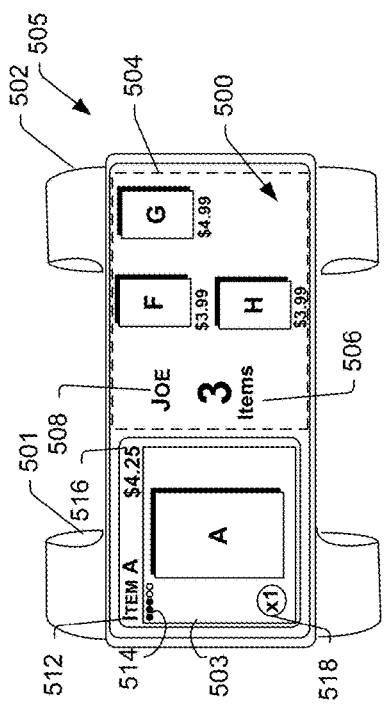

FIG. 5B is representative of an item review user interface which may be presented when an item is picked by a user, when a user selects the graphical representation of an item, etc. For example, if the user selects the graphical representation 510 (FIG. 5A), the user may be presented with additional information about the item as well as alternative items that may correspond with the item picked by the user. In some implementations, the user interface 520 may be presented when an item is picked from an inventory location. In still another example, the item review user interface 520 may be presented when a user selects the graphical representation of a presented item.

In the item review user interface 520, an alternative item selection control 522 may be presented. The user may interact with the alternative item selection control 522 to correct an identification of a picked item. In some implementations, the alternative item selection control 522 may include a graphical representation of alternative items that may correspond with the picked item. For example, if the determination of the picked item results in a high probability for multiple items as potentially being representative of the picked item, a graphical representation of each item may be presented as part of the alternative item selection control 522. A user may select any of the graphical representations included in the alternative item selection control 522 to identify an alternative item as the actual item picked by the user. If none of the graphical representations identified in the alternative item selection control 522 correspond with the actual picked item, the user may select the "Other" 524 control to obtain additional alternative items or to identify the actually picked item using other inputs. In some implementations, a user may select the quantity 518 identifier to alter a quantity of the picked item.

Figure 5C:
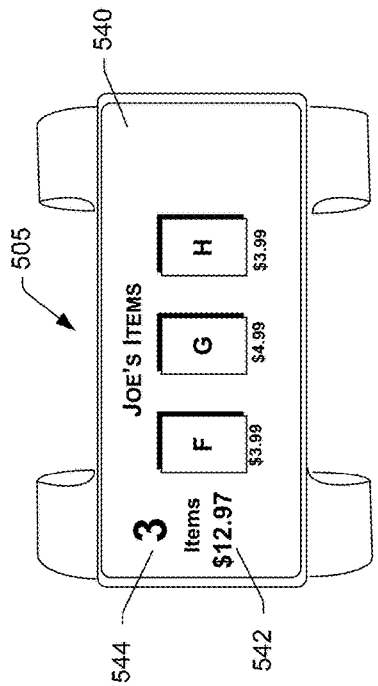
Figure 5D:
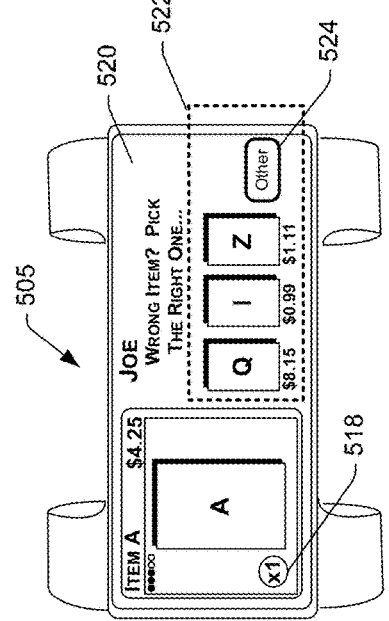

FIG. 5C is another block diagram of an item identifier list representation 530. In this example, the user has added the picked item, "Item A" to the tote associated with the user and the item identifier associated with Item A has been added to the item identifier list. As a result of the addition, the item identifier list representation 530 is updated to identify to the user that the user now has four items in the tote and associated with their item identifier list, as illustrated by the graphical representations 532, 534, 536, 538. As with the other example of the item identifier list representation (FIG. 4), the graphical representations may be presented to correspond with the order in which the items were picked, as well as the relative size of each item with respect to the other items. Additional item information, such as price, name, quantity of the item picked by the user, weight of the item, information about the item, a date when the user last picked the item, a serving size of the item, an ingredient list associated with the item, a rating of the item, etc., may also be included in the item identifier list representation.

If, at some point, the user removes an item from the tote and returns it to an inventory location, the item is determined and the associated item identifier is removed from the item identifier list. Additionally, the item identifier list representation 540 is updated to reflect that the item has been removed from the tote associated with the user and is no longer identified on the item identifier list. In this example, the user has removed Item A from the tote and returned it to an inventory location. To illustrate to the user that the inventory management system 150 correctly identified the item and correctly removed the item identifier from the item identifier list, the item identifier list representation 540 is updated to remove the graphical representation of the item and the updated item identifier list representation is presented to the user via the device 505, or another output device. In addition to removing the graphical representation of the removed item, the total price 542 and total quantity 544 may also be updated to illustrate that the item removed from the tote was correctly identified by the inventory management system 150 and removed from the item identifier list associated with the user.

Figure 6:
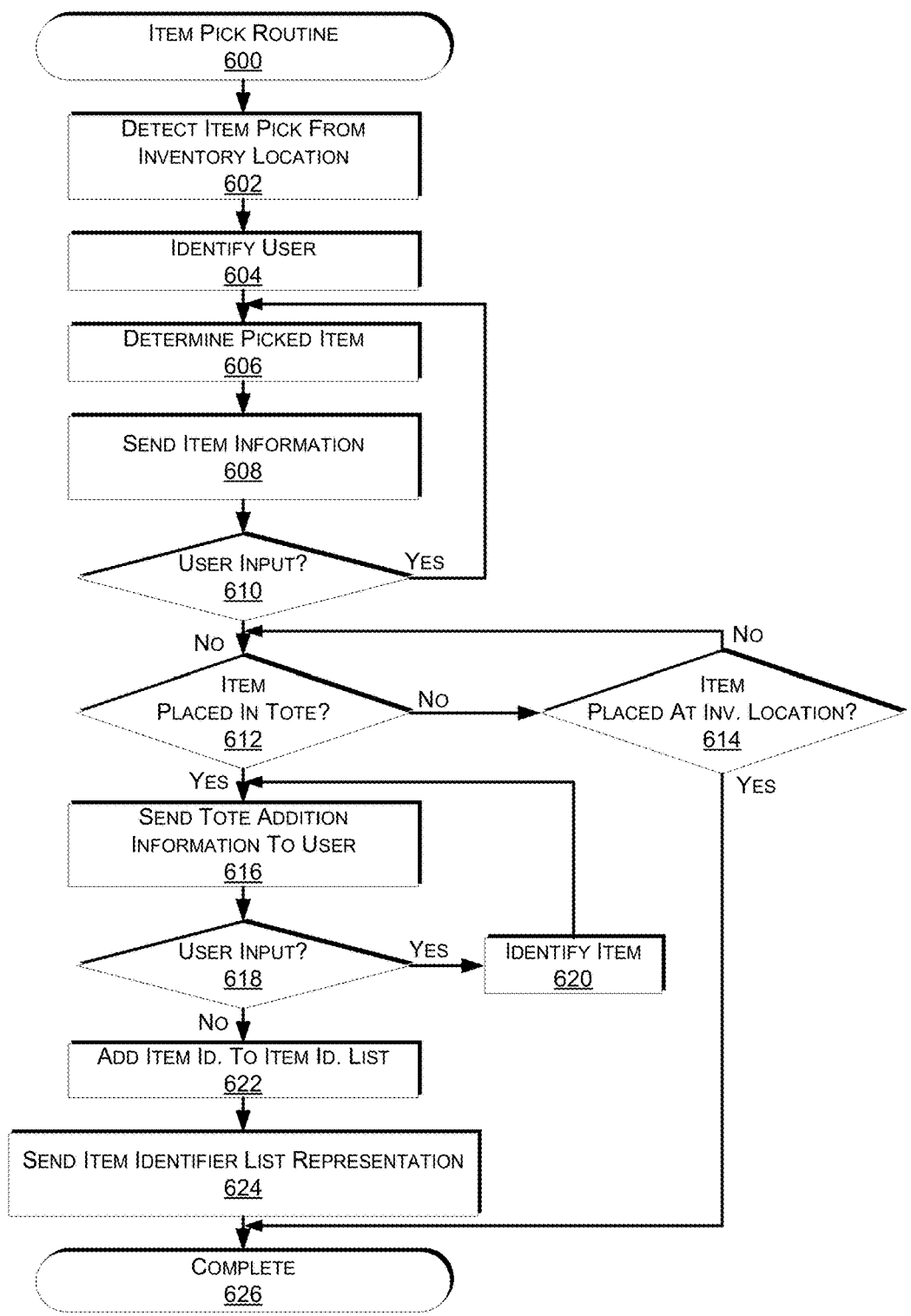
FIG. 6 is a flow diagram of an example item pick routine, according to one implementation.

FIG. 6 depicts a flow diagram of an example item pick routine 600, according to one implementation. The example routine of FIG. 6 and each of the other routines discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example routine 600 begins by detecting an item pick from an inventory location, as in 602. A pick of an item from an inventory location may be determined using a variety of inputs from the inventory management system. For example, each shelf of an inventory location may include a pressure sensor, load cell, scale, etc. (generally, "weight determining element") and when the item is picked from the inventory location the weight determining element will detect a change in weight resulting from the removal of the item from the inventory location. In another example, one or more images of the item being removed may be captured by an image capture device and used to determine that an item has been picked from the inventory location. For example, one or more cameras positioned within the shelf may capture a before and after image of the inventory location, representative of the inventory location before the item was picked and after the item was picked. The images may then be compared and a determination made that the item was removed and thus picked from the inventory location. In still other examples, a light curtain may be configured to detect the movement of an item into and/or out of the inventory location.

In addition to detecting an item pick from the inventory location, the user that picked the item is also identified, as in 604. As discussed above, a variety of techniques may be utilized, alone or in combination, to identify a user. For example, a user may be identified as they enter the materials handling facility using facial recognition, biometrics, user provided information, active tags, visual tags, etc. The location of the user may be monitored as the user moves through the materials handling facility and thus, the user that picked the item is known. In another example, one or more images of the user may be captured as the user picked the item and processed to determine the identity of the user. Again, this may be accomplished using facial and/or object recognition.

The example routine also determines the picked item, as in 606. The picked item may be determined, for example, based on the inventory location, based on an active tag attached to the item being detected, etc. For example, the inventory management system 150 may maintain inventory information for each inventory location that identifies the items at that inventory location. When an item is picked from the inventory location, the identity of the item is determined based on the stored inventory information. Alternatively, or in addition thereto, one or more images of the picked item may be captured and processed using object recognition, character recognition, edge detection, etc. to identify characteristics of the item. The determined characteristics may be compared with stored item information to determine the item.

In some implementations, a probability score may be assigned to each item information identifying the probability that the item information corresponds to the actually picked item. For example, if the item is removed from a shelf that contains three different types of items, each with similar weights, a probability score may be determined for each item information that is associated with items at the inventory location having a weight similar to the weight of the removed item. The item with the highest probability score is determined to be the picked item.

In another example, if the item is being identified based on image processing, the comparison of the image of the item with stored item image information will result in a probability score for each stored item image information. The item image information with the highest probability score is determined as representative of the picked item.

Based on the determined item, item information associated with the item is sent for presentation to the user that picked the item from the inventory location, as in 608. The item information includes a graphical representation of the item and additional information about the item. For example, item information may include a price of the item, a name of the item, a quantity of the item determined to be picked by the user, a weight of the item, information about the item, a date when the user last picked the item, a serving size of the item, an ingredient list associated with the item, a rating of the item, etc. The item information may be maintained in the inventory data store 1315 and when the item is identified, the item information may be obtained, a user interface generated by the inventory management system and sent to a display or device for presentation to the user. In some implementations, the inventory management system may maintain user presentation preferences in the user profile data store 1317 that identify the type and/or amount of item information that is to be presented to the user. The user presentation preferences may also specify the types of displays or devices to which item information is to be sent for presentation to the user and/or include information as to how information is to be presented on those displays or devices.

In addition to sending item information associated with the item determined to be the picked item, an alternative item selection control may also be sent for presentation to the user. The alternative item selection control may include representations of other item information determined to have a high probability of corresponding to the picked item. For example, the second and third highest probability scores may be identified and a representation of the items associated with the item information included in the alternative item selection control.

Upon sending the item information and the alternative item selection control, a determination is made as to whether a user input is received, as in 610. A user input, may be, for example, a selection of the alternative item selection control, a change in quantity of the item, or a confirmation that the representation of the item corresponds to the picked item. With the exception of a confirmation that the item information corresponds to the picked item, if a user input is received. The example routine returns to block 606 and the item is again identified based on the user input. For example, if the user selects one of the representations of an item in the alternative item selection control, the input from the user may be utilized to update the identification of the item.

If it is determined that no user input is received, a determination is made as to whether the picked item is placed in a tote associated with the user, as in 612. If it is determined that the item is not placed into the tote associated with the user, a determination is made as to whether the item is placed back at the inventory location from where it was picked and/or placed at another inventory location, as in 614. If it is determined that the item has not been placed at an inventory location, the example routine 600 returns to decision block 612 and continues.

Returning to decision block 612, if it is determined that the item is placed into the tote associated with the user, tote addition information is generated and sent for presentation to the user, as in 616. Tote addition information may be a visual, audible and/or tactile feedback to the user that the inventory management system has correctly identified the picked item and correctly determined that the item has been added to the tote associated with the user. In one implementation, the tote addition information could be an animation of the graphical representation of the item transitioning from the item information presented when the user picked the item to the item identifier list representation, representative of the items currently in the tote associated with the user and identified on the item identifier list associated with the user.

In addition to sending the tote addition information to the user, a determination is made as to whether a user input is received, as in 618. Similar to the above, a user may provide an input at any time to alter and/or correct an item identification and/or to confirm an item identification and/or item addition to the tote. If a user input is received, the item may be re-identified based on the user input, as in 620. For example, if the user input is an input that the determined item does not correspond with the item actually picked and placed into the tote, the user may identify the correct item. If the identity of the item is corrected, or the quantity updated, the example routine 600 may again provide the tote addition information to the user, as in 616.

If it is determined that no user input has been received, the item identifier associated with the item determined to have been picked by the user and placed into the tote associated with the user is added to the item identifier list associated with the user, as in 622. Likewise, an updated item identifier list representation is generated that includes a representation of the added item and optionally additional item information. The updated item identifier list representation is then sent for presentation to the user to provide confirmation to the user that the item has been correctly identified and added to the item identifier list associated with the user, as in 624. The presentation of the item identifier list representation may be visual, audible, and/or tactile. For example, the item identifier list representation may be visually presented on a portable device associated with the user and an audible tone may be emitted to confirm the update.

After sending the item identifier list representation to the user or if it is determined that the picked item was placed back at an inventory location (decision block 614), the example routine 600 completes, as in 626.

In some implementations, a user may not place items they desire into their tote. For example, a user may select a group of produce items, request to have meat sliced, or select to have some other additional processing performed with respect to a picked item. For example, a user may pick a fish from the fresh fish inventory section. When the fresh fish is selected, item information associated with the fish is sent to the user for presentation. However, rather than placing the item in the tote associated with the user or returning the picked fish to the inventory location, the user may take the fish to an assistance station so that the fish can be weighed, cleaned and prepared for the user. In such an example, as the user approaches the assistance station, user information and/or picked item information may be sent to the assistance station for presentation to an associate located at the assistance station. For example, user information may include a name of the user and an image of the user (such as the image of the user captured when the user entered the materials handling facility). With this information, the associate can identify the user as they approach and greet them by name.

The user may provide the selected item(s), in this example a fish, to the associate. The associate may confirm to the inventory management system the identity of the item and obtain characteristics about the item. For example, the user may weigh the item (a characteristic). If additional processing is to be performed with respect to the item and/or if the assistance station is currently in use, the user may simply leave the item at the assistance station and/or place the item in a processing station for processing at the assistance station. Upon leaving the item at the assistance station, the item remains associated with the user. If the user placed the item at a processing station, the item and/or the user may also be associated with the processing station. As the associate becomes available, the associate will perform any additional processing of the item(s) and then place the item(s) at a retrieval location. When items are placed at a retrieval location, the retrieval location is associated with the item and/or the user. In addition, a notification that the item is available for retrieval is sent for presentation to the user. In some implementations, the retrieval location may be a, shelf, bin, tray, tote, secure container that can only be accessed by the user, etc. After the item has been placed at the retrieval location, the user may retrieve the item at their convenience.

Figure 7B:
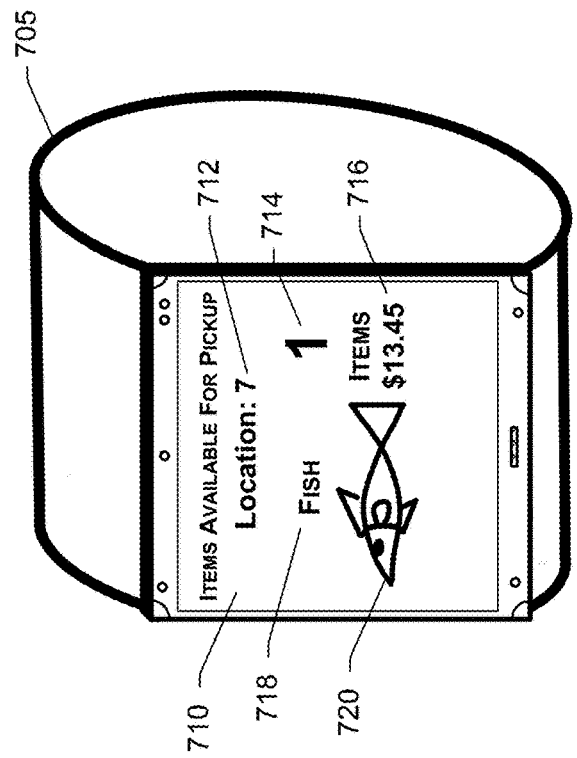
FIGS. 7A-7B are block diagrams illustrating different item information presented on a device, according to one implementation.
Figure 7A:
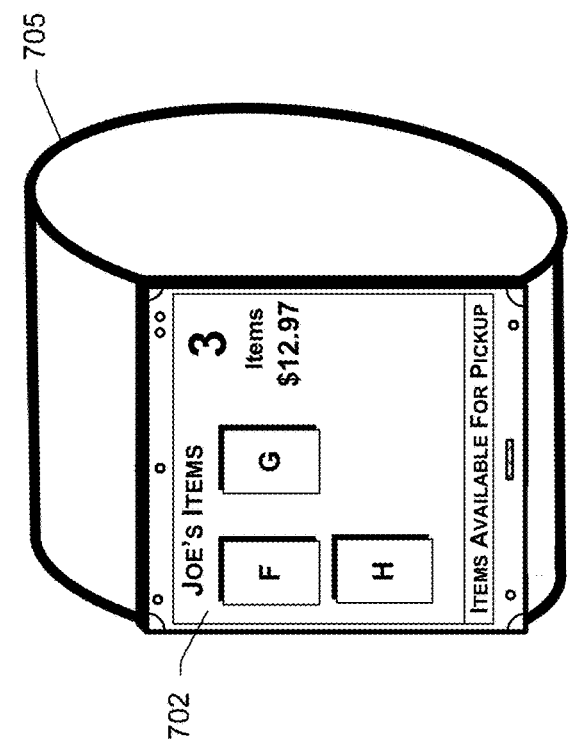

FIGS. 7A-7B are block diagrams illustrating different item information presented on a device for notifying a user that an item is available for retrieval at a retrieval location, according to one implementation. For example, the portable device 705 may present one or more of the user interfaces discussed above, such as the item identifier list representation. When an item becomes available for retrieval at a retrieval location a notification (audible, visual and/or haptic) may be sent and presented to the user via the device 705. For example, a notification 704 may scroll or persist on the user interface 702 notifying the user that an item is available for retrieval at a retrieval location. A user may obtain addition information by selecting the notification.

FIG. 7B includes a user interface 710 presented on the portable device 705 that includes retrieval information. The retrieval information may include, for example, the location of the retrieval location 712, a quantity 714 of the items to retrieved, a price 716 of the item(s) to be retrieved, a name 718 of the item to be retrieved, a graphical representation 720 of the item to be retrieved and/or other item information. Upon receiving the notification, a user may retrieve the item from the retrieval location.

While the above example illustrates an assistance station that includes an associate that provides assistance to a user, in some implementations, the assistance station may be a self-service assistance station that is utilized by the user to obtain additional information about an item, determine characteristics (e.g., size, weight, volume, quantity) of an item, etc. For example, the assistance station may be configured for bulk items, such as coffee beans, flour, etc. A user may select a container or bag into which the bulk item is to be place, interact with the assistance station to cause the bulk item to be dispensed and then obtain characteristics (e.g., weight, price) about the item. As another example, the assistance station may be configured to determine a weight and a price for mixed items, such as salads, fruit, etc. A user may obtain the mixed items they desire and then interact with the assistance station to determine the characteristics of the mixed item and a price for the mixed item.

In some implementations, a user may not place items they desire into their tote. For example, a user may select a group of produce items, request to have meat sliced, or select to have some other additional processing performed with respect to a picked item. For example, a user may pick a fish from the fresh fish inventory section. When the fresh fish is selected, item information associated with the fish is sent to the user for presentation. However, rather than placing the item in the tote associated with the user or returning the picked fish to the inventory location, the user may take the fish to an assistance station so that the fish can be weighed, cleaned and prepared for the user. In such an example, as the user approaches the assistance station, user information and/or picked item information may be sent to the assistance station for presentation to an associate located at the assistance station. For example, user information may include a name of the user and an image of the user (such as the image of the user captured when the user entered the materials handling facility). With this information, the associate can identify the user as they approach and greet them by name.

The user may provide the selected item(s), in this example a fish, to the associate. The associate may confirm to the inventory management system the identity of the item and obtain characteristics about the item. For example, the user may weigh the item (a characteristic). If additional processing is to be performed with respect to the item and/or if the assistance station is currently in use, the user may simply leave the item at the assistance station and/or place the item in a processing station for processing at the assistance station. Upon leaving the item at the assistance station, the item remains associated with the user. If the user placed the item at a processing station, the item and/or the user may also be associated with the processing station. As the associate becomes available, the associate will perform any additional processing of the item(s) and then place the item(s) at a retrieval location. When items are placed at a retrieval location, the retrieval location is associated with the item and/or the user. In addition, a notification that the item is available for retrieval is sent for presentation to the user. In some implementations, the retrieval location may be a shelf, bin, tray, tote, secure container that can only be accessed by the user, etc. After the item has been placed at the retrieval location, the user may retrieve the item at their convenience.

Figure 8A:
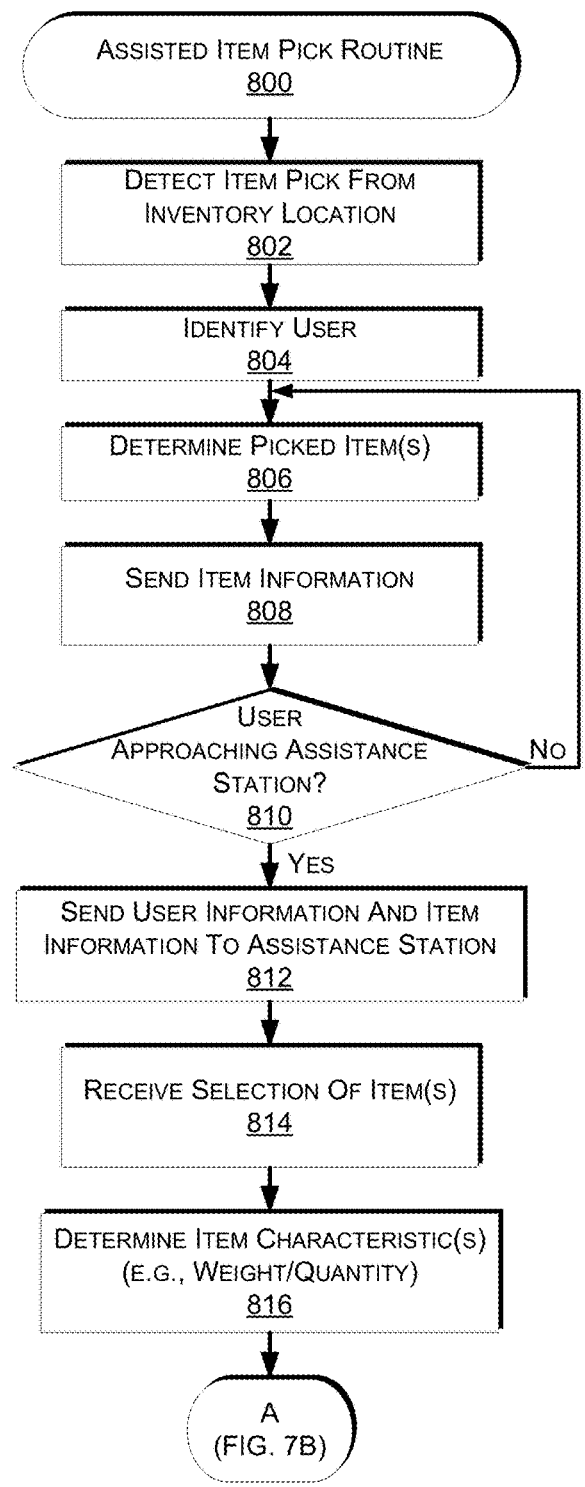
FIGS. 8A-8B is a flow diagram of an example assisted item pick routine, according to one implementation.
Figure 8B:
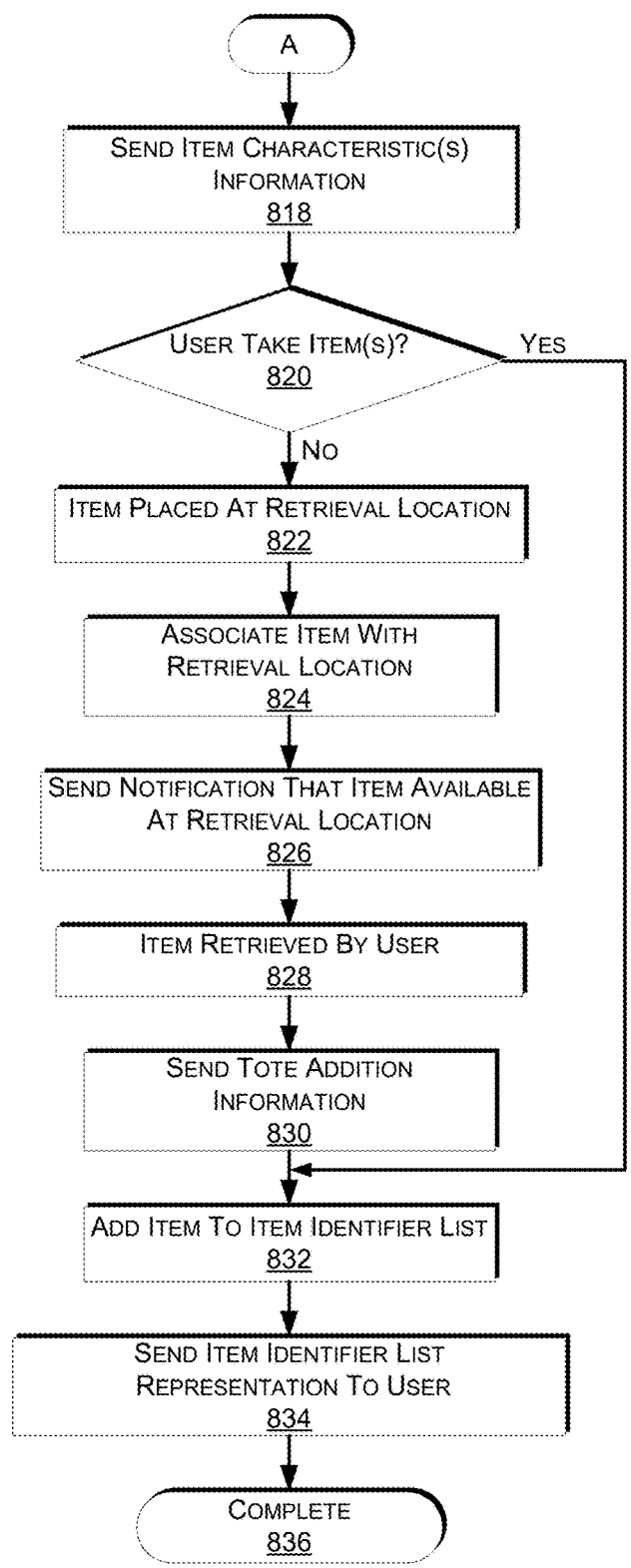

FIGS. 8A-8B is a flow diagram of an example assisted item pick routine, according to one implementation. As discussed above, an assistance station may include an associate that provides assistance to a user or may be a self-service assistance station utilized by a user.

The example routine 800 begins by detecting an item pick from an inventory location, as in 802. A pick of an item from an inventory location may be determined using a variety of inputs from the inventory management system. For example, each shelf of an inventory location may include a pressure sensor, load cell, scale, etc. (generally, "weight determining element") and when the item is picked from the inventory location the weight determining element will detect a change in weight resulting from the removal of the item from the inventory location. In another example, one or more images of the item being removed may be captured by an image capture device and used to determine that an item has been picked from the inventory location. For example, one or more cameras positioned within the shelf may capture a before and after image of the inventory location, representative of the inventory location before the item was picked and after the item was picked. The images may then be compared and a determination made that the item was removed and thus picked from the inventory location. In still other examples, a light curtain may be configured to detect the movement of an item into and/or out of the inventory location.

In addition to detecting an item pick from the inventory location, the user that picked the item is also identified, as in 804. As discussed above, a variety of techniques may be utilized, alone or in combination, to identify a user. For example, a user may be identified as they enter the materials handling facility using facial recognition, biometrics, user provided information, active tags, visual tags, etc. The location of the user may be monitored as the user moves through the materials handling facility and thus, the user that picked the item is known. In another example, one or more images of the user may be captured as the user picked the item and processed to determine the identity of the user. Again, this may be accomplished using facial and/or object recognition.

The example routine also determines the picked item, as in 806. The picked item may be determined, for example, based on the inventory location, based on an active tag attached to the item being detected, etc. For example, the inventory management system 150 may maintain inventory information for each inventory location that identifies the items at that inventory location. When an item is picked from the inventory location, the identity of the item is determined based on the stored inventory information. Alternatively, or in addition thereto, one or more images of the picked item may be captured and processed using object recognition, character recognition, edge detection, etc. to identify characteristics of the item. The determined characteristics may be compared with stored item information to determine the item.

In some implementations, a probability score may be assigned to each item information identifying the probability that the item information corresponds to the actually picked item. For example, if the item is removed from a shelf that contains three different types of items, each with similar weights, a probability score may be determined for each item information that is associated with items at the inventory location having a weight similar to the weight of the removed item. The item with the highest probability score is determined to be the picked item.

In another example, if the item is being identified based on image processing, the comparison of the image of the item with stored item image information will result in a probability score for each stored item image information. The item image information with the highest probability score is determined as representative of the picked item.

Based on the determined item, item information associated with the item is sent for presentation to the user that picked the item from the inventory location, as in 808. The item information includes a graphical representation of the item and additional information about the item. For example, item information may include a price of the item, a name of the item, a quantity of the item determined to be picked by the user, a weight of the item, information about the item, a date when the user last picked the item, a serving size of the item, an ingredient list associated with the item, a rating of the item, etc. The item information may be maintained in the inventory data store 1315 and when the item is identified, the item information may be obtained, a user interface generated by the inventory management system and sent to a display or device for presentation to the user. In some implementations, the inventory management system may maintain user presentation preferences in the user profile data store 1317 that identify the type and/or amount of item information that is to be presented to the user. The user presentation preferences may also specify the types of displays or devices to which item information is to be sent for presentation to the user and/or include information as to how information is to be presented on those displays or devices.

In addition to sending item information associated with the item determined to be the picked item, an alternative item selection control may also be sent for presentation to the user. The alternative item selection control may include representations of other item information determined to have a high probability of corresponding to the picked item. For example, the second and third highest probability scores may be identified and a representation of the items associated with the item information included in the alternative item selection control.

A determination is also made as to whether the user is approaching an assistance station, as in 810. If it is determined that the user is not approaching an assistance station, the example routine returns to block 806 and continues. However, if it is determined that the user is approaching an assistance station, user information and item information is sent to the assistance station, as in 812.

In some implementations, the user may approach the assistance station without first picking any items. For example, if the item the user is interested in obtaining is only available through the assistance station, the user may proceed directly to the assistance station to obtain the item. For example, if the user is interested in obtaining coffee beans that are dispensable from the assistance station, the user may proceed directly to the assistance station. In such instances, blocks 802-808 may be omitted from the example routine 800. Likewise, rather than sending user information and item information to the assistance station, only user information may be sent.

If an associate is located at the assistance station, the user information and/or item information may be presented to the associated. The user information may include a representation of the user, the name of the user, etc. The item information may include item information determined to correspond to the item picked that is to be provided at the assistance station.

An item selection is received from the assistance station to confirm the identity of the item to be processed at the assistance station, as in 814. For example, if the assistance station is a self-service assistance station, the user may select the item they desire, such as a particular type of coffee bean and cause the coffee bean to be dispensed into a bag or container for the user. If the assistance station includes an associate, the associate may select, confirm, or identify the item to be processed. For example, if the assistance station is a butcher station, the user may request meat from an associate located at the assistance station. The associate may provide the meat to the associate and provide an identification of the selected item (meat) to the example routine 800.

Upon item identification confirmation, one or more characteristics of the item may be determined, as in 816. Characteristics may include, weight, volume, price, size, etc. For example, the coffee beans may be weighed as they are dispensed and once dispensing has completed a price may be determined. Turning to FIG. 8B, the determined item characteristic information may be sent for presentation, as in 818. The characteristic information may be sent for presentation on a display or other output device at the assistance station and/or sent for presentation to another device within the materials handling facility, such as the portable device or the display coupled with the tote associated with the user.

A determination may also be made as to whether the user has taken the item with them from the assistance station, as in 820. As discussed above, an item may be left by the user at the assistance station for additional processing and/or later retrieval. For example, if additional processing is to be performed with respect to the item, the user may leave the item at the processing station while they move throughout the materials handling facility.

If it is determined that the item was left at the assistance station, at a later point in time the item will be placed at a retrieval location, as in 822. The retrieval location may be any location where an item may be placed for retrieval by a user. For example, a retrieval location may be a shelf, bin, tote, cart, bag, etc. When it is determined that the item has been placed at a retrieval location, the item and/or the user associated with the item are associated with the retrieval location, as in 824. In addition, a notification may be sent to the user that identifies to the user that the item is available for retrieval at the retrieval location. The notification may also include specific information regarding the location of the retrieval location.

After providing the notification, the item is retrieved from the retrieval location by the user, as in 828, and tote addition information is sent for presentation to the user, as in 830. Tote addition information is a visual, audible and/or tactile feedback to the user that the inventory management system has correctly identified that the user has retrieved the item from the retrieval location and placed the item in their tote.

The item identifier associated with the item retrieved from the retrieval location is added to the item identifier list associated with the user, as in 832. Likewise, an updated item identifier list representation is generated that includes a representation of the added item and optionally additional item information. The updated item identifier list representation is then sent for presentation to the user to provide confirmation to the user that the item has been correctly identified and added to the item identifier list associated with the user, as in 634. The presentation of the item identifier list representation may be visual, audible, and/or tactile. For example, the item identifier list representation may be visually presented on a portable device associated with the user and an audible tone may be emitted to confirm the update.

After sending the item identifier list representation to the user, the example routine 800 completes, as in 836.

Figure 9B:
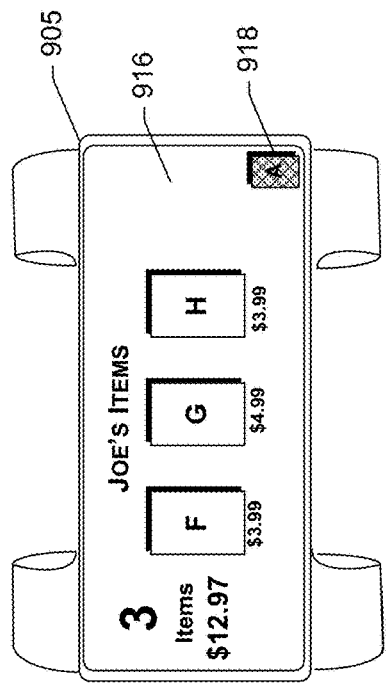
FIGS. 9A-9B are block diagrams illustrating different item information presented on a device, according to one implementation.
Figure 9A:
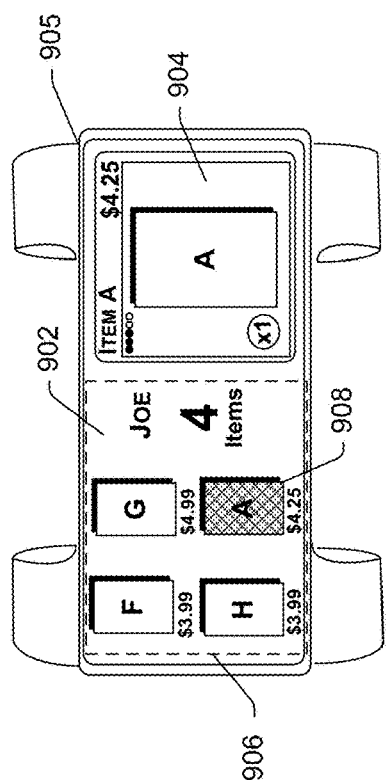

FIGS. 9A-9B are block diagrams illustrating different item information presented on a device, according to one implementation. FIG. 9A illustrates a user interface 902 presented on a device 905 in response to a user removing an item from their tote. When the user removes an item from their tote, the item is identified and item information, including a representation of the item, is presented to the user to confirm to the user that the inventory management system has correctly identified the item removed by the user from the tote associated with the user. In this example, the user has removed an item and the inventory management system has determined that the removed item is Item A. Based on the determination, item information 904 representative of item A is presented to the user. The item information 904 may include a representation of the item along with other information about the item (e.g., name, price, quantity removed from tote). In addition to providing the item information for the removed item, the item identifier list representation 906 may be updated to modify the representation 908 of the removed item. For example, the representation 908 for Item A may be greyed out to illustrate that the item has been removed from the tote associated with the user but not yet removed from the item identifier list associated with the user.

Turning now to FIG. 9B, if the user places the removed item at an inventory location, the placed item is detected by the inventory management system and the item identifier associated with the item is removed from the item identifier list associated with the user. Likewise, the item identifier list representation 916 is also updated to remove the representation and other item information for the placed item. In this example, the representation for Item A has been removed from the item identifier list representation 916. In some implementations, as illustrated in FIG. 9B, a modified representation 918 may be presented as part of the item identifier list representation 916 to identify that the item was previously in the tote associated with the user but has been removed from the tote and removed from the item identifier list associated with the user.

Figure 10:
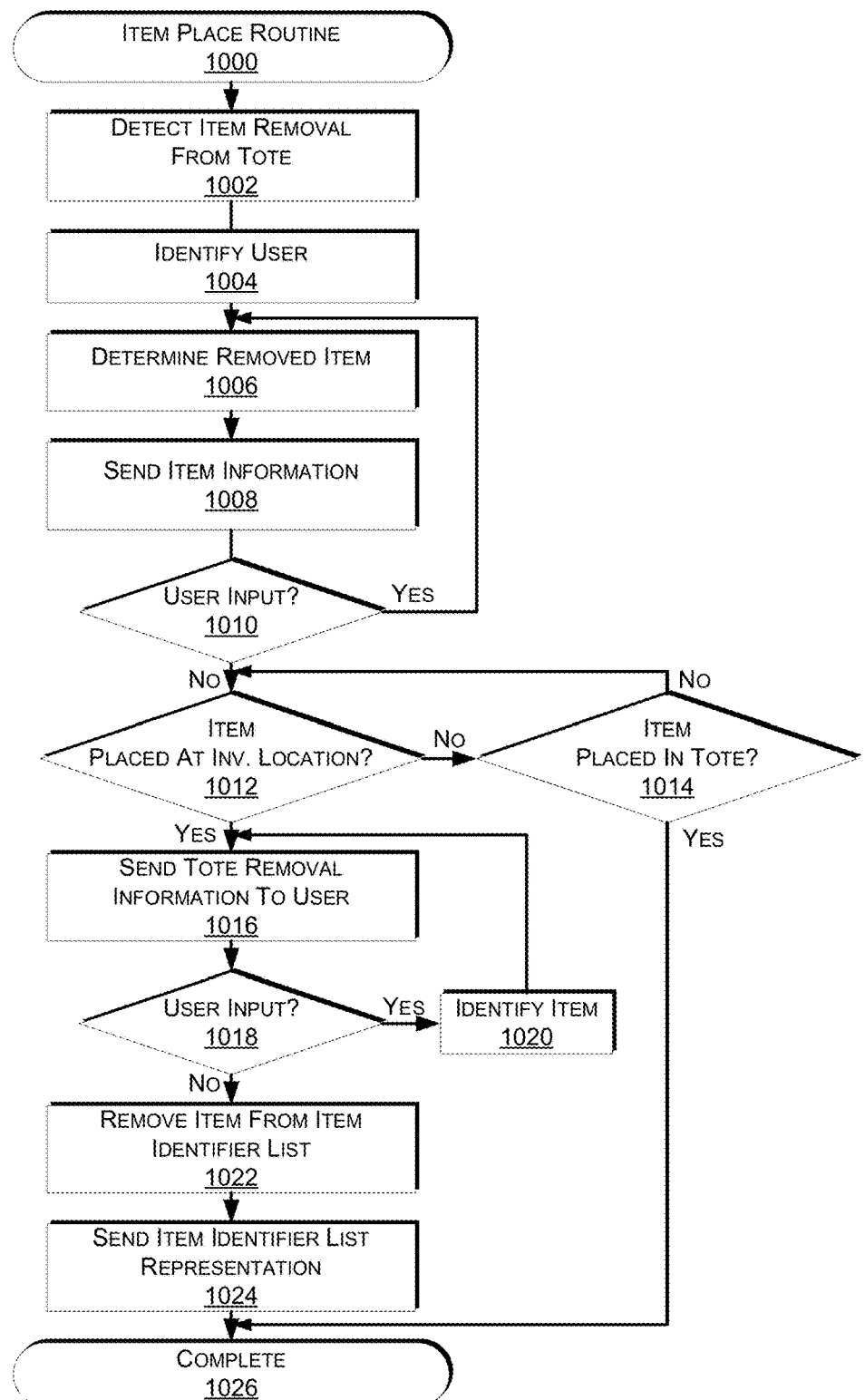
FIG. 10 is a flow diagram of an item place routine, according to one implementation.

FIG. 10 is a flow diagram of an item place routine 1000, according to one implementation. The example routine 1000 begins by detecting an item removal from a tote, as in 1002. An item removal from a tote may be determined using a variety of inputs from the inventory management system. For example, each tote may include a pressure sensor, load cell, scale, etc. (generally, "weight determining element") and when the item is picked from the tote the weight determining element will detect a change in weight resulting from the removal of the item from the tote. In another example, one or more images of the item being removed may be captured by an image capture device and used to determine that an item has been removed from the tote.

In addition to detecting an item removal from the tote, the user associated with the tote is also identified, as in 1004. As discussed above, a variety of techniques may be utilized, alone or in combination, to identify a user. For example, a user may be identified as they enter the materials handling facility using facial recognition, biometrics, user provided information, active tags, visual tags, etc. The location of the user may be monitored as the user moves through the materials handling facility and thus, the user that removed the item from the tote is known. In another example, one or more images of the user may be captured as the user removed the item from the tote and those images may be processed to determine the identity of the user. Again, this may be accomplished using facial and/or object recognition. In still another example, the tote may include a unique identifier that is provided to the inventory management system and associated with the user. When the tote provides a notification that an item has been removed, the identity of the user may be determined based on the association between the unique identifier and the user.

The example routine also determines the removed item, as in 1006. The removed item may be determined, for example, based on the size, shape, color and/or weight of the removed item. Alternatively, or in addition thereto, an active or visual tag on the item may be detected as the item is removed from the tote. Alternatively, or in addition thereto, one or more images of the item as it is removed from the tote may be captured and processed using object recognition, character recognition, edge detection, etc. to identify characteristics of the item. The determined characteristics may be compared with stored item information of items included in the tote to determine the item.

In some implementations, a probability score may be assigned to each item information identifying the probability that the item information corresponds to the actually removed item. For example, if the item is removed from a tote that contains three different types of items, each with similar weights, a probability score may be determined for each item information that is associated with items in the tote having a weight similar to the weight of the removed item. The item with the highest probability score is determined to be the removed item.

In another example, if the item is being identified based on image processing, the comparison of the image of the item with stored item image information will result in a probability score for each stored item image information. The item image information with the highest probability score is determined as representative of the removed item.

Based on the determined item, item information associated with the item is sent for presentation to the user that removed the item from the tote, as in 1008. The item information includes a graphical representation of the item and additional information about the item. For example, item information may include a price of the item, a name of the item, a quantity of the item determined to be picked by the user, a weight of the item, information about the item, a date when the user last picked the item, a serving size of the item, an ingredient list associated with the item, a rating of the item, etc. The item information may be maintained in the inventory data store 1315 and when the item is identified, the item information may be obtained, a user interface generated by the inventory management system and sent to a display or device for presentation to the user.

In addition to sending item information associated with the item determined to be the removed item, an alternative item selection control may also be sent for presentation to the user. The alternative item selection control may include representations of other item information determined to have a high probability of corresponding to the removed item. For example, the second and third highest probability scores may be identified and a representation of the items associated with the item information included in the alternative item selection control.

Upon sending the item information and the alternative item selection control, a determination is made as to whether a user input is received, as in 1010. A user input, may be, for example, a selection of the alternative item selection control, a change in quantity of the item, or a confirmation that the representation of the item corresponds to the removed item. With the exception of a confirmation that the item information corresponds to the removed item, if a user input is received, the example routine returns to block 1006 and the item is again identified based on the user input. For example, if the user selects one of the representations of an item in the alternative item selection control, the input from the user may be utilized to update the identification of the item.

If it is determined that no user input is received, a determination is made as to whether the removed item is placed at an inventory location, as in 1012. If it is determined that the item is not placed at the inventory location associated with the user, a determination is made as to whether the item is placed back into the tote, as in 1014. If it is determined that the item has not been placed back into the tote, the example routine 1000 returns to decision block 1012 and continues.

Returning to decision block 1012, if it is determined that the item has been placed at an inventory location, tote removal information is generated and sent for presentation to the user, as in 1016. Tote removal information may be a visual, audible and/or tactile feedback to the user that the inventory management system has correctly identified the removed item and correctly determined that the item has been returned to inventory and removed from the item identifier list associated with the user. In one implementation, the tote removal information could be an animation of the graphical representation of the item transitioning from the item identifier list representation off the display or to a smaller area of the display representative of removed items.

In addition to sending the tote removal information to the user, a determination is made as to whether a user input is received, as in 1018. Similar to the above, a user may provide any input at any time to alter and/or correct an item identification and/or to confirm an item identification and/or item removal from the tote. If a user input is received, the item may be re-identified based on the user input, as in 1020. For example, if the user input is an input that the determined item does not correspond with the item actually removed from the tote and placed at an inventory location, the user may identify the correct item. If the identity of the item is corrected, or the quantity updated, the example routine 1000 may again provide the tote removal information to the user, as in 1016.

If it is determined that no user input has been received, the item identifier associated with the item determined to have been removed by the user and placed at an inventory location is removed from the item identifier list associated with the user, as in 1022. Likewise, an updated item identifier list representation is generated that does not include a representation of the added item. Alternatively, the updated item identifier list representation may include a modified version of the representation to illustrate that the item has been removed from the tote and is no longer identified on the item identifier list. The updated item identifier list representation is then sent for presentation to the user to provide confirmation to the user that the item has been correctly identified and removed from the item identifier list associated with the user, as in 1024. The presentation of the item identifier list representation may be visual, audible, and/or tactile. For example, the item identifier list representation may be visually presented on a portable device associated with the user and an audible tone may be emitted to confirm the update.

After sending the item identifier list representation to the user or if it is determined that the picked item was placed back at an inventory location (decision block 1014), the example routine 1000 completes, as in 1026.

Figure 11:
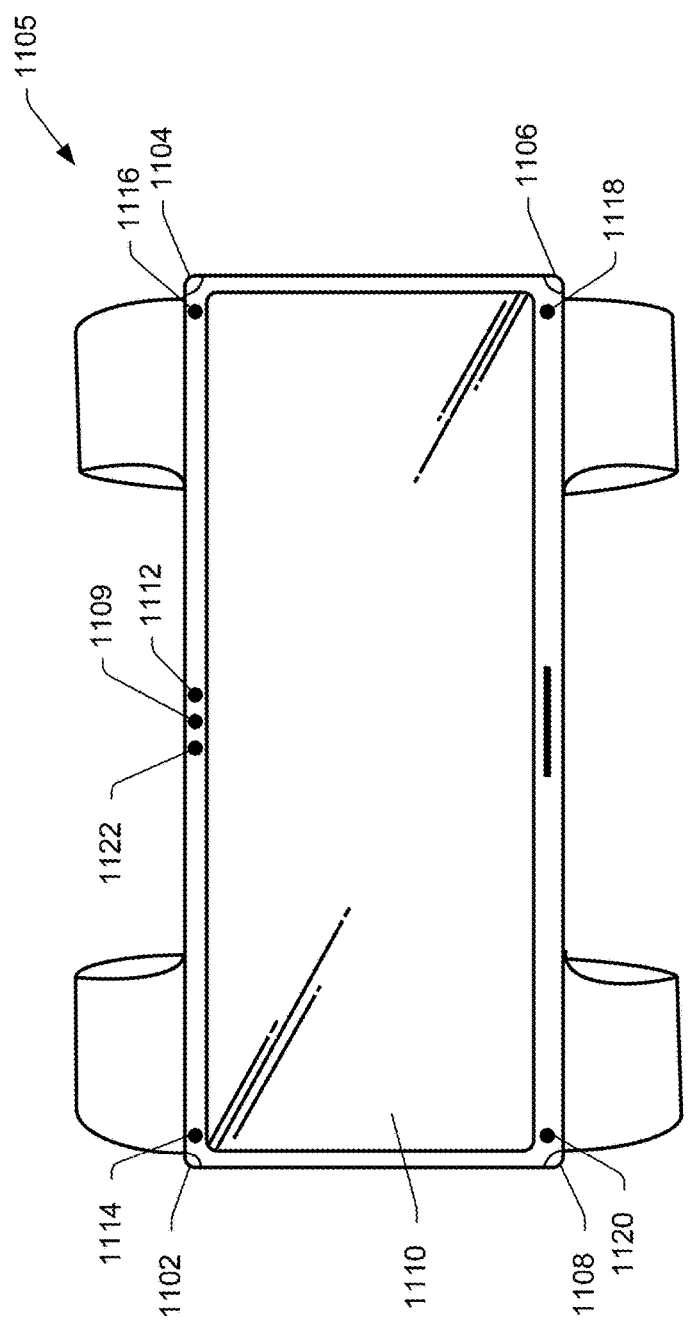
FIG. 11 illustrates an example device that can be used in accordance with various implementations.

FIG. 11 illustrates an example device 1105 including multiple components that can be used to capture various types of input and provide various outputs, in accordance with different implementations. It should be understood that, while the components of the example device are shown to be on a "front" of the device, there can be similar or alternative components on the sides or back of the device as well (or instead). Further, directions such as "top," "side," and "back" are used for purposes of explanation and are not intended to require specific orientations unless otherwise stated. It will also be appreciated that, while the form factor of the device 1105 is illustrated as a dual strap device that may be attached to the user's arm, tote, or other object, the structure and feature of the device 1105 and the components discussed with respect to FIG. 12, may be implemented in a variety of form factors.

In this example device 1105, there are four imaging elements (e.g., cameras) 1102, 1104, 1106, 1108 on the corners of the device, an illumination element 1109 on the front of the device and a touch-screen display 1110. The touch screen display 1110 may be formed using various display technologies (e.g., LCD, OLED, eInk, and so forth) in combination with a touch sensitive layer, such as capacitive touch sensor.

If the imaging elements have a sufficient wide-angle lens (e.g., a fish-eye lens), the imaging elements can have at least partially overlapping fields of view such that the imaging elements might be able to capture input from substantially any direction around the device. Examples of suitable imaging elements include hi-resolution RGB cameras and low-resolution RGB cameras. In this example, each imaging element also has an associated illumination element 1114, 1116, 1118, 1120 operable to direct light over a range of angles associated with a respective imaging element. Example illumination elements include, but are not limited to, light emitting diodes ("LED"), infrared illumination elements, visible light illumination elements, ultraviolet illumination elements, etc. Although the illumination elements are shown on the front of the device for convenience, it should be understood that the illumination elements can be on the corners of the device as well, and in at least some implementations can utilize the same wide-angle lenses to project light over a range of angles at least including the field of view of the respective imaging element. The illumination elements 1114-1120 are also operable to project illumination (e.g., white light or IR) to assist with image capture and/or identification of the device 1105 to the inventory management system 150, as discussed above. The device 1105 may also include a light sensor 1112 for use in determining when illumination might be needed. A projector 1122, such as a pico-projector, visual projector, structured light projector, etc., may also be included on the device 1105.

As discussed, an advantage of having a large number of imaging elements, illumination elements, touch-based displays, projectors and other such input components is to facilitate interaction with the user of the device 1105 and/or to communicate with the inventory management system 150. For example, if the user is in a crowded area such that detection of the user is difficult, the illumination element 1114 may emit a light or light pattern to aid in the location detection of the user by the inventory management system 150. In some implementations, the light or light pattern may not be perceivable by a human but detectable by one or more of the image captures devices within the materials handling facility. For example, the illumination element 1114 may emit a light pattern using infrared light. The infrared light may not be visible to humans but detectable by the image capture devices. For example, a series of images may be captured and analyzed to identify a pattern of light emitted by the device. The pattern of light identified from the series of images may be unique to and associated with the device so that the device can be identified.

In addition to imaging elements and touch-based input, as discussed below, the devices may also include a variety of other input components, such as an accelerometer, gyroscope, inertial sensor, pressure sensor, microphone, a barometer, a global positioning system (GPS), a compass, and the like.

Figure 12:
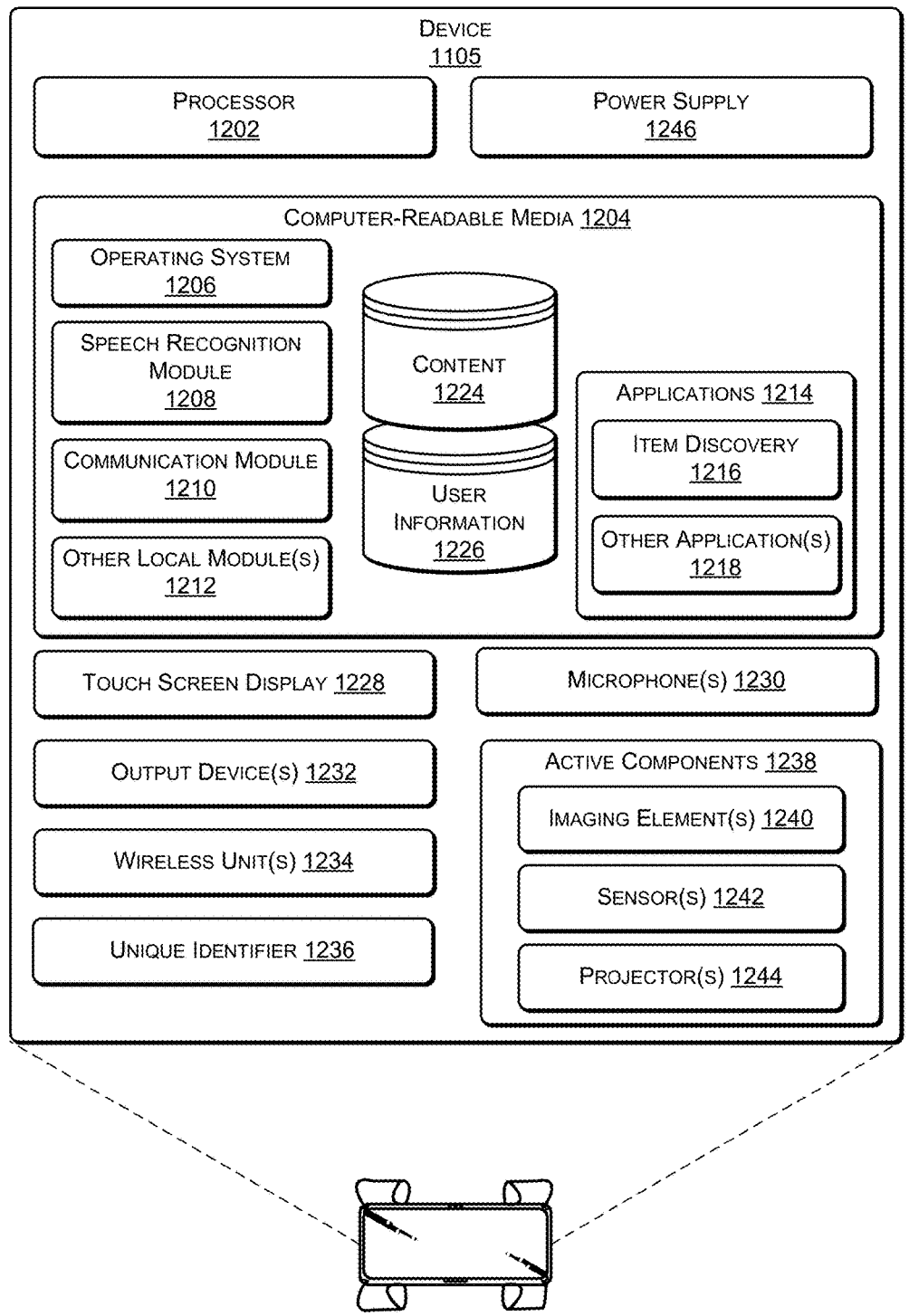
FIG. 12 illustrates an example configuration of components of a device, such as that illustrated in FIG. 11.

FIG. 12 illustrates example functional components of the example device 1105 of FIG. 11, in accordance with an implementation. The device 1105 includes one or more processors 1202 and computer-readable media 1204. The computer-readable media 1204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology. The computer-readable media 1204 may be implemented as computer-readable storage media ("CRSM"), which may be any available physical media accessible by the processor(s) 1202 to execute instructions stored on the media 1204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1202.

Several modules such as instruction, data stores, and so forth may be stored within the computer-readable media 1204 and configured to execute on the processor(s) 1202. A few example functional modules are shown stored in the computer-readable media 1204, although the same functionality may alternatively be implemented in hardware, firmware, or as a system on a chip (SOC).

An operating system module 1206 may be configured to manage hardware and services within and coupled to the device 1105 for the benefit of other modules. A speech recognition module 1208 may employ any number of conventional speech recognition techniques such as use of natural language processing and extensive lexicons to interpret voice input. A communication module 1210, such as a wireless transceiver, facilitates communication, such as cellular communication, RF communication, Wi-Fi communication, Bluetooth communication, satellite-based communication, optical communication, and so forth. For example, the communication module 1210 may facilitate communication with the inventory management system 150 via the network 202 or over another wired and/or wireless communication path. Other local modules 1212 may also be present on the device, depending upon the implementation and configuration of the device. These modules may include more extensive speech recognition techniques, filters and echo cancellation modules, voice recognition modules, and so forth.

The device 1105 may also include a plurality of applications 1214 stored in the computer-readable media 1204 or otherwise accessible to the device 1105. In this implementation, the applications 1214 are item discovery 1216 and other applications 1218. However, the device 1105 may include any number or type of applications and is not limited to the specific example shown here. In one implementation, the device may be configured as a stand-alone component such that it can perform all of the features and functions discussed herein. For example, the device 1105 may maintain item information, capture images of items as they are picked by the user, process those images to determine the picked item, and provide item information to the user. Likewise, the device may maintain the item identifier list, detect an addition of an item to the tote associated with the user, present tote addition information to the user, and add an item identifier to the item identifier list.

Data stores may also be stored locally on the media 1204, including a content data store 1224 and one or more user information 1226 of users that have interacted with and/or use the device 1105. The content data store 1224 may include various content that may be played or presented by the device, such as item information, music, books, magazines, videos and so forth. The user information data store 1226 may include user characteristics, preferences (e.g., how item information is to be presented, how item list identifier representations are to be presented), usage history, purchase history, item identifier list, and other information specific to an individual user.

Generally, the device 1105 has a touch screen display 1228 and may include other input devices, such as a keypad, control buttons, etc. One or more microphones 1230 may be included to receive audio input. Output devices 1232 may include a display, an illumination element (e.g., LED), speaker, a vibrator to create haptic sensations, microphone(s) or the like. The device 1105 might further include a wireless unit 1234 coupled to an antenna to facilitate a wireless connection to one or more networks, such as the network 202. The wireless unit 1234 may implement one or more of various wireless technologies, such as Wi-Fi, Bluetooth, RF, and so on.

The device may also include an embedded unique identifier 1236. The unique identifier may be embedded into a memory 1204 of the device 1105 or otherwise stored and accessible by the device 1105.

The device 1105 may also be equipped with multiple active components 1238. Any number of components may be used. Representative components include imaging elements 1240, sensors 1242 and projectors 1244. The device 1105 may also include some form of power supply 1246, such as a battery, solar power, or other form of power supply for providing power to the device during operation.

While the example device 1105 is discussed herein as a single device, in other implementations, the device 1105 may be implemented as multiple devices. For example, one or more of the output components (e.g., microphone), imaging elements 1240 (e.g., camera), sensors 1242 (e.g., microphone, speaker) and/or projectors 1244 may be implemented in a first device, such as an earpiece, and other components, such as the touch screen display 1228, computer-readable media 1204, etc., may be implemented as a second device. In such implementations, the first device and the second device may communicate over a wired and/or wireless communication path (e.g., Bluetooth, NFC) and provide the features and functions of the device 1105, discussed herein. Generally, the device 1105 may be implemented as any form of computing device(s) that may be worn, placed upon and/or carried by a user that is capable of communicating with other computing devices, such as computing devices of inventory management system, and capable of presenting information to the user (e.g., audible, visual, tactile).

FIG. 13 is a pictorial diagram of an illustrative implementation of a server system, such as the server system 303 that may be used in the implementations described herein. The server system 303 may include a processor 1300, such as one or more redundant processors, a video display adapter 1302, a disk drive 1304, an input/output interface 1306, a network interface 1308, and a memory 1312. The processor 1300, the video display adapter 1302, the disk drive 1304, the input/output interface 1306, the network interface 1308, and the memory 1312 may be communicatively coupled to each other by a communication bus 1310.

The video display adapter 1302 provides display signals to a local display (not shown in FIG. 13) permitting an operator of the server system 303 to monitor and configure operation of the server system 303. The input/output interface 1306 likewise communicates with external input/output devices not shown in FIG. 13, such as a mouse, keyboard, scanner, or other input and output devices that can be operated by an operator of the server system 303. The network interface 1308 includes hardware, software, or any combination thereof, to communicate with other computing devices. For example, the network interface 1308 may be configured to provide communications between the server system 303 and other computing devices via the network 202, as shown in FIG. 2 and FIG. 3.

The memory 1312 generally comprises random access memory (RAM), read-only memory (ROM), flash memory, and/or other volatile or permanent memory. The memory 1312 is shown storing an operating system 1314 for controlling the operation of the server system 303. A binary input/output system (BIOS) 1316 for controlling the low-level operation of the server system 303 is also stored in the memory 1312.

The memory 1312 additionally stores program code and data for providing network services that allow the inventory management system 150 to identify users and/or items within the materials handling facility. Accordingly, the memory 1312 may store a browser application 1318. The browser application 1318 comprises computer executable instructions, that, when executed by the processor 1300 generate or otherwise obtain configurable markup documents such as Web pages. The browser application 1318 communicates with a data store manager application 1320 to facilitate data exchange between the inventory data store 1315, the user profile data store 1317 and/or the item identifier list data store 1319.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 1315-1319 as needed to execute aspects of the inventory management system 150.

The data stores 1315-1319 can include several separate data tables, databases or other data storage mechanisms and media for storing data relating to a particular aspect. For example, the data stores 1315-1319 illustrated include mechanisms for maintaining inventory information (e.g., item locations, images of item when properly positioned, item features), user profile information, item lists associated with users, etc., which can be used to provide confirmations to a user that the inventory management system and properly identified an item and/or the action performed by the user.

It should be understood that there can be many other aspects that may be stored in the data stores 1315-1319. The data stores 1315-1319 are operable, through logic associated therewith, to receive instructions from the server system 303 and obtain, update or otherwise process data in response thereto.

The memory 1312 may also include the inventory management system 150, discussed above. The inventory management system 150 may be executable by the processor 1300 to implement one or more of the functions of the server system 303. In one implementation, the inventory management system 150 may represent instructions embodied in one or more software programs stored in the memory 1312. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of one or more computing systems configured with executable instructions,
   detecting, with a weight determining element positioned at an inventory location within a materials handling facility, a change in a weight at the inventory location resulting from a removal of an item from the inventory location;
   determining, based at least in part on the change in the weight, that a user has picked an item from the inventory location within the materials handling facility;
   in response to determining that the user has picked an item, sending for presentation to the user, first item information and second item information, wherein:
   the first item information includes a representation of a first item determined to be associated with the picked item; and
   the second item information includes a representation of a second item and is selectable by the user to replace the representation of the first item as more accurately representative of the picked item;
   receiving a user input selecting the representation of the second item; and
   determining that the user has placed the picked item into a tote;
   adding a second item identifier associated with the representation of the second item to an item identifier list; and
   sending for presentation to the user, an item identifier list representation, wherein the item identifier list representation includes the representation of the second item.

2. The computer-implemented method of claim 1, wherein the item identifier list representation further includes at least one of: a price of the second item, a total price of all items identified in the item identifier list, a user identifier, a representation of a third item included in the tote, or a representation of a fourth item that was removed from the tote.

3. The computer-implemented method of claim 1, wherein the representation of the second item is determined based at least in part on the determination that the first item is associated with the picked item.

4. The computer-implemented method of claim 1, wherein the first item is determined to be associated with the picked item based at least in part on one or more of: the inventory location from where the picked item was picked, an image processing of an image of the picked item, an active identifier on the picked item, a visual identifier on the picked item, a weight of the picked item, a color of the picked item, or a shape of the picked item.

5. The computer-implemented method of claim 1, wherein the one or more computing systems is a portable device associated with the user.

6. The computer-implemented method of claim 5, wherein the portable device is coupled to a tote associated with the user.

7. The computer-implemented method of claim 1, wherein the one or more computing systems include a server computing system in network communication with a device accessible to the user.

8. The computer-implemented method of claim 7, wherein the device accessible to the user is at least one of: a portable device associated with the user, a device coupled to a tote associated with the user, a user's device, a display within the materials handling facility, or a projector within the materials handling facility.

9. The computer-implemented method of claim 1, wherein the first item information is presented to the user as a visual confirmation that the picked item has been determined.

10. The computer-implemented method of claim 1, wherein the representation of the second item is presented to the user to enable the user to correct an inaccurate determination of the picked item.

11. The computer-implemented method of claim 1, wherein the item identifier list representation is presented to the user to provide an overview of items included in the tote.

12. A system, comprising:
a plurality of cameras within a materials handling facility; and
a computing system, including:
one or more processors; and
a memory coupled to the one or more processors and storing program instructions that when executed by the one or more processors cause the one or more processors to at least:
receive image data from at least one of the plurality of cameras, wherein the image data includes a representation of at least one of an item or an inventory location corresponding to the item;
process the image data to determine at least one of:
that the item has been picked from the inventory location within the materials handling facility; or
a characteristic of the item;
determine a first item information and a second item information from a plurality of stored item information, based on at least one of:
a comparison of the image data representative of the item with the stored item information;
a comparison of the characteristic of the item with the stored item information; or
stored item information associated with the inventory location from which the item was picked;
send for presentation, the first item information and the second item information, wherein:
the first item information includes a representation of a first item determined to be associated with the picked item; and
the second item information includes a representation of a second item and is selectable to replace the representation of the first item as more accurately representative of the picked item;
receive an input selecting the representation of the second item; and
determine that the item has been placed into a tote;
add a second item identifier associated with the representation of the second item to an item identifier list; and
send for presentation, an item identifier list representation, wherein the item identifier list representation includes the representation of the second item.

13. The system of claim 12, wherein the item identifier list representation further includes at least one of: a price of the second item, a total price of all items identified in the item identifier list, a user identifier, a representation of a third item included in the tote, or a representation of a fourth item that was removed from the tote.

14. The system computing system of claim 12, wherein the representation of the second item is determined based at least in part on the determination that the first item is associated with the picked item.

15. The system computing system of claim 12, wherein the first item is determined to be associated with the picked item based at least in part on one or more of: the inventory location from where the picked item was picked, an image processing of an image of the picked item, an active identifier on the picked item, a visual identifier on the picked item, a weight of the picked item, a color of the picked item, or a shape of the picked item.

16. The system of claim 12, wherein the first item information is presented as a visual confirmation that the picked item has been determined.

17. The system of claim 12, wherein the representation of the second item is presented to enable correction of an inaccurate determination of the picked item.

18. The system of claim 12, wherein the program instructions that cause the one or more processors to process the image data further include instructions that cause the one or more processors to at least:
compare the image data with a first stored item image information corresponding to the first item information to determine a probability score that the first item information is representative of the item.

19. The system of claim 12, further comprising:
a weight determining element positioned at the inventory location; and
wherein the program instructions further cause the one or more processors to at least:
receive from the weight determining element an indication of a change in a weight at the inventory location resulting from the pick of the item from the inventory location; and
based at least in part on the indication of the change in weight, determine that the item has been picked from the inventory location.

* * * * *